United States Patent

Krimm et al.

[15] 3,670,024

[45] June 13, 1972

[54] PROCESS FOR THE PRODUCTION OF 4,4′-DIAMINODIARYL ALKANES

[72] Inventors: Heinrich Krimm, Krefeld-Bockum; Artur Botta; Hermann Schneill, both of Krefeld-Verdingen, all of Germany

[73] Assignee: Farbenfabriken Bayer Aktiengesellschaft, Leverkusen, Germany

[22] Filed: June 24, 1969

[21] Appl. No.: 838,045

Related U.S. Application Data

[63] Continuation of Ser. Nos. 485,123, Sept. 3, 1965, abandoned, and Ser. No. 747,014, July 17, 1968, abandoned.

[30] Foreign Application Priority Data

Nov. 4, 1964 Germany.............................F 44 367

[52] U.S. Cl........................260/570 D, 260/288 R, 260/393, 260/501.21, 260/566 F, 260/592, 260/596, 260/47 EN

[51] Int. Cl.........................................................C07c 87/50

[58] Field of Search ......................260/353, 570 D

[56] References Cited

UNITED STATES PATENTS

| 1,591,384 | 7/1926 | Homolka | 260/570 |
|---|---|---|---|
| 2,683,730 | 7/1954 | Seeger et al. | 260/453 |
| 3,260,751 | 7/1966 | Powers et al. | 260/570 |
| 3,277,139 | 10/1966 | Powers et al. | 260/570 X |
| 3,362,979 | 1/1968 | Bentley | 260/570 X |

FOREIGN PATENTS OR APPLICATIONS

| 137,635 | 1/1930 | Switzerland | 260/570 |

*Primary Examiner*—Robert V. Hines
*Attorney*—Connolly and Hutz

[57] ABSTRACT

Production of 4,4′-diaminodiaryl-alkanes by reacting a ketone and a salt of an aromatic amine at normal pressure, under anhydrous conditions and in a melt of the amine, said diaryl alkanes being useful for the production of plastics, the preparation of polyamides and as hardeners for epoxy resins.

5 Claims, No Drawings

PROCESS FOR THE PRODUCTION OF 4,4'-DIAMINODIARYL ALKANES

This application is a continuation of Ser. No. 485,123 and 747,014 filed Sept. 3, 1965 and July 17, 1968, respectively, and both now abandoned.

The invention relates to a process for the production of 4,4'-diaminodiaryl alkanes by reacting ketones with salts of aromatic amines in the melt.

It is known to prepare 4,4'-diaminodiphenyl alkanes by condensation of ketones with aromatic amines, mainly aniline, in the presence of aqueous hydrochloric acid under pressure at temperatures of about 150° C. Using this process, acetone and aniline provide 2,2-bis-(4-aminophenyl)-propane with a yield of only 13 percent of the theoretical (Liebigs Annalen der Chemie, 472 1, (1929), U.S. Pat. No. 2,794,822). This is to be readily understood, since it is known that quinoline derivatives are formed under the same conditions.

On the contrary, the reaction of ketones with aromatic amines in the presence of small quantities of amine hydrochloride or $ZnCl_2$ only leads in a few cases to diaminodiphenyl alkanes. Acetone and also acetophenone can of course be reacted in this way with tertiary amines, such as N,N-dimethyl aniline (Liebigs Annalen der Chemie 242, 333, 1887). Under these conditions, primary aromatic amines initiate condensation to form anil or quinoline bodies. Thus, when heating acetophenone with aniline and aniline-hydrochloride at 180° C, there is formed a mixture of acetophenone anil, dypnone anil and 1,3,5-triphenyl-benzene (Berichte der Deutschen Chemischen Gesellschaft 43, 2477; Liebigs Annalen der Chemie 388, 185 and 195), while the reaction of anhydrous aniline hydrochloride with acetone in a closed vessel leads to a quinoline derivative (Berichte der Deutschen Chemischen Gesellschaft 65, 1514, 1932).

It has now surprisingly been found that ketones can be reacted with salts of primary, secondary and tertiary aromatic amines under anhydrous conditions and at normal pressure in the melt to give good yields of 4,4'-diaminodiaryl alkanes, and in the case where acetone is reacted with aniline hydrochloride, the formation of the quinoline derivative is almost completely suppressed.

Obviously, there was formerly a prejudice against reacting low-boiling ketones (such as acetone of Bp 56° C) with high-melting amine salts, (such as aniline hydrochloride of Mp 199° C) in an open reaction vessel, i.e., under normal pressure. However, the advantage of the present pressure-free process according to the invention consists in that the concentration of ketone in the reaction mixture can be kept as low as desired and thus the formation of spontaneous condensation products can be prevented, which leads for example with acetone and aniline by way of mesityl oxide to the quinoline derivative and with acetophenone to dypnone and 1,3,5-triphenylbenzene.

The process is explained by using as an example the reaction of acetone with aniline hydrochloride:

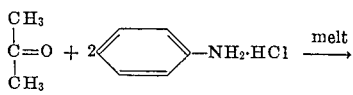

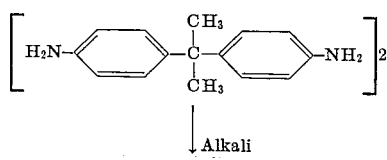

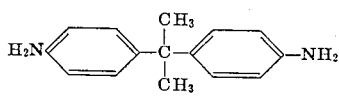

Aliphatic, cycloaliphatic, mixed aliphatic and aromatic, and also aromatic ketones are considered for the process and the following are mentioned as advantageous: acetone, methylethylketone, methylisopropylketone, diethylketone, cyclopentanone, cyclohexanone, cyclododecanone, acetophenone, propiophenone and benzophenone.

Suitable as amines are unsubstituted primary, secondary and tertiary aromatic amines with a free p-position, and also such amines which are substituted in the nucleus by aliphatic, aromatic, halogen, hydroxy groups and alkoxy groups. Preferred aromatic amines are, for example, for following: aniline, 2- and 3-toluidine; 2,6-xylidene; 2,5-xylidene; 3,5-xylidene; 2-ethylaniline; 2-isopropylaniline; 2-tert.-butylaniline; 2- and 3-chloranilines; 2- and 3-bromanilines; 2-fluoraniline; 2,6-dichloraniline; 2-chloro-6-methylaniline; 2-hydroxyaniline; 2-methoxyaniline; 2-ethoxyaniline; 4-aminodiphenyl; 1-naphthylamine and also their corresponding N-mono- and N,N-dialkylation products, and as alkyl radicals on the nitrogen atom, there are mainly to be considered those with 1 to 4 carbon atoms and also the cyclohexyl radical.

The acids used for forming the salt must not have too high a degree of acidity, but they should also lead to the formation salts with a melting point which is advantageously below 250° C. It is preferred to use hydrohalic acids, such as hydrobromic acid, but more especially hydrochloric acid, and also aryl-sulphonic acids, such as benzene-sulphonic acid or p-toluo-sulphonic acid.

The preferred procedure is for the ketone in liquid or vapor form, possibly mixed with inert gas, to be introduced slowly into a two to six times excess of such a salt of the aromatic amine, mainly in the melt or in solution, the ketone being introduced at the rate at which it is consumed in the reaction.

The reaction temperature is generally about 120° to about 250° C. advantageously 150° to 220° C.

Although the present condensation reaction also occurs without using catalysts, catalytic additives can be used, depending on circumstances. More especially suitable for this purpose are proton or Lewis acids, for example HCl, $H_3PO_4$, $P_2O_5$, $ZnCl_2$, $BF_3$ or activated alumina. Those additives which lower the melting temperature of the reaction mixture may also be advantageous. The acid catalysts referred to above already show this effect, as do organic compounds, such as phenols, or high-boiling polar solvents, such as nitrophenols, 2,4,6-trichlorphenol, dichlornaphthalenes, nitrobenzene, nitro-toluene, nitrodiphenyl.

The working up and isolation of the 4,4'-diaminodiaryl alkanes which are obtained is effected in the usual way, employing alkali for the purpose of liberating the base from the forming amine salt. The diaminodiaryl alkanes can be purified by distillation at reduced pressure or by recrystallization.

They can be used for the production of plastics. 4,4' diamino diaryl alkanes may be used for producing polyamides. They are further suitable as hardeners for epoxy resins. This may be exemplified as follows:

An epoxy resin produced from bisphenol-A and epichlorohydrine is reacted with diamino-diphenyl propane. The heat distortion temperature is at 165° C. For comparison: In hardening the same resin with diethylene triamine the heat distortion temperature is 125° C.

EXAMPLE 1

3,900 g. (30 mols) of aniline hydrochloride are melted in a 6-liter spherical flask under nitrogen and 290 g. (5 mols) of acetone are slowly added thereto while stirring, over a period of 5 hours. The temperature of the melt falls because of the reflux, which gradually becomes stronger from initially 200° to 185° C. The temperature is kept for 1 hour at 185° C and the hot melt is poured on to a mixture of 8 kg. of ice and 3.5 kg. of 45 percent sodium hydroxide solution. The organic layer is separated and the aqueous phase is extracted with 1 liter of methylene chloride. The combined organic phases are washed free from salt with distilled water and solvent and excess aniline are extracted in vacuo. With the vacuum distillation of the residue, 795 g. (70.5 percent of the theoretical) distil over at 175° to 200° C/bp$_{0.5}$. The 2,2-bis-(4-aminophenyl)-propane, which solidifies on cooling, melts at 133° C after being recrystallized from toluene.

EXAMPLE 2

To a melt of 1,035 g. (8 mols) of aniline hydrochloride, which is disposed in a vertical tube with a height of 40 cm. and a diameter of 6.5 cm., there are supplied, over a period of 3½ hours and through a tube fitted in the bottom. 93 g. (1.6 mols) of acetone in vapor form and at 200° C. while stirring. A weak stream of hydrogen chloride is at the same time conducted through the reaction mixture. Unreacted acetone and also water formed during the reaction are distilled off. Sixty five g. of the acetone supplied are reacted. The melt is worked up as in Example 1 with 3 kg. of ice and 1 kg. of 45 percent sodium hydroxide solution. The vacuum distillation of the reaction product supplies 185 g. (73 percent of the theoretical) of 2,2-bis-(4-amino-phenyl)-propane, Bp$_{0.07}$ = 180°–191° C. Melting point after recrystallization from toluene: 132°–133° C.

EXAMPLE 3

In a manner similar to that described in Example 1, 3,900 g. (30 mols) of aniline hydrochloride and 600 g. (5 mols) of acetophenone supply 983 g. (68 percent of the theoretical) of the previously unknown 1,1-bis-(4-amino-phenyl)-1-phenylethane. The compound can be distilled at 231°–238° C/Bp$_{0.3}$ almost without decomposition and have a melting point of 159°.

$C_{20}H_{20}N_2$ (288.36)
Calculated: C 83.30 H 6.99 N 9.72
Found: C 83.29 H 7.15 N 9.67

EXAMPLE 4

In a manner corresponding to Example 1, 60 g. (0.5 mol) of acetophenone are reacted with 430 g. (3 mols) of o-toluidine hydrochloride at 215° C. There are obtained 85 g. (66.5 percent of the theoretical) of 1,1-bis-(4-amino-3-methylphenyl)-1-phenyl-ethane of 222° to 226° C/Bp$_{0.1}$. Melting point 152°. The compound was previously unknown.

$C_{22}H_{24}N_2$ (316.45)
Calculated: C 83.50 H 7.65 N 8.85
Found: C 83.30 H 7.74 N 8.74

EXAMPLE 5

Hydrogen chloride is introduced into 3,200 g. (30 mols) of N-methylaniline until saturation is reached, while the temperature is allowed to rise to 150° C. While stirring vigorously, acetone is introduced dropwise at the rate at which it is used up by reaction with the N-methylaniline hydrochloride. After 14 hours, 174 g. (3 mols) of acetone are reacted. The reaction product is dissolved in 2 liters of water and made strongly alkaline with dilute sodium hydroxide solution. The organic layer is taken up in methylene chloride and washed several times with water. The solvent is then evaporated, the excess N-methylaniline is distilled off in vacuo, and the residue is dissolved in methanol. By cooling with a mixture of ice and common salt, the 2,2-bis-(4-methylaminophenyl)-propane is obtained in crystallized form. Yield: 504 g. = 66 percent of the theoretical. Melting point: 132°–133° C.

EXAMPLE 6

Hydrogen chloride is introduced into 642 g. (6 mols) of N-methylaniline until saturation is reached. After the temperature has been allowed to rise to 150° C., 90 g. (1 mol) of cyclohexanone are introduced dropwise over a period of 3 hours while stirring vigorously and the temperature is thereafter kept for 1 hour at 150° C. The hot melt is poured on to a mixture of 1.5 kg. of ice and 1 kg. of 45 percent sodium hydroxide solution, then the mixture is shaken well in a separating funnel and the organic phase is separated. The excess N-methylaniline is extracted in vacuo and the remaining residue is distilled. The main quantity distils over at 197°–203° C./Bp 0.05; 198 g. (67:4 percent of the theoretical). After recrystallization, the 1,1-bis-(4'-N-methylaminophenyl)-cyclohexane melts at 122° C.

We claim:

1. A process for producing 4,4'-diaminodiaryl alkanes which comprises introducing, under anhydrous conditions and at normal pressure, a ketone into an excess of a molten amine salt which is at a temperature of between 120° and 250° C., said ketone being introduced at a rate corresponding to its consumption rate in the ensuing reaction, said ketone being selected from the group consisting of acetone, methylethylketone, methylisopropylketone, diethylketone, cyclopentanone, cyclohexanone, acetophenone and propiophenone and the amine of said salt being of the formula

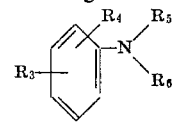

wherein $R_3$ and $R_4$ are ortho and meta substituents selected from the group consisting of hydrogen, alkyl containing from one to four carbon atoms, chloro, bromo and fluoro and $R_5$ and $R_6$ are selected from the group consisting of hydrogen, alkyl containing from one to four carbon atoms and cyclohexyl.

2. The process of claim 1 wherein said ketone is acetone.

3. The process of claim 1 wherein said amine is selected from the group consisting of aniline, 2- and 3-toluidine, 2,6-xylidene, 2,5-xylidene, 3,5-xylidene, 2-ethylaniline, 2-isopropylaniline, 2-tert.-butylaniline, 2- and 3-chloraniline, 2- and 3-bromaniline, 2-fluoraniline, 2,6-dichloraniline, 2-chloro-6-methylaniline, 2-hydroxyaniline, 2-methoxyaniline, 2-ethoxyaniline, 4-aminodiphenyl, 1-naphthylamine and N-mono and N,N-dialkylation products of said aromatic amines.

4. The process of claim 3 wherein said salts of said amines are salts of acids selected from the group consisting of hydrochloric acid, hydrobromic acid, benzene sulphonic acid and p-toluene sulphonic acid.

5. The process of claim 3 wherein the alkyl radicals of the N-mono and N,N-dialkylation products are selected from the group consisting of alkyl having one to four carbon atoms and cyclohexyl.

* * * * *